United States Patent
Akkarakaran et al.

(10) Patent No.: US 12,389,399 B2
(45) Date of Patent: Aug. 12, 2025

(54) SIDELINK FEEDBACK FORMAT

(71) Applicant: QUALCOMM Incorporated, San Diego, CA (US)

(72) Inventors: Sony Akkarakaran, Poway, CA (US); Tao Luo, San Diego, CA (US); Jelena Damnjanovic, Del Mar, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 17/301,081

(22) Filed: Mar. 24, 2021

(65) Prior Publication Data

US 2021/0306997 A1  Sep. 30, 2021

Related U.S. Application Data

(60) Provisional application No. 63/001,099, filed on Mar. 27, 2020.

(51) Int. Cl.
*H04W 72/20* (2023.01)
*H04L 1/1607* (2023.01)
*H04W 72/23* (2023.01)

(52) U.S. Cl.
CPC ........... *H04W 72/20* (2023.01); *H04L 1/1607* (2013.01); *H04W 72/23* (2023.01)

(58) Field of Classification Search
None
See application file for complete search history.

(56) References Cited

U.S. PATENT DOCUMENTS

| | | |
|---|---|---|
| 10,595,311 B2 | 3/2020 | Gupta et al. |
| 10,912,114 B2 | 2/2021 | Baghel et al. |

(Continued)

FOREIGN PATENT DOCUMENTS

| | | | |
|---|---|---|---|
| CN | 202010019617.3 | * | 3/2020 |
| JP | 2019-137127 | * | 4/2019 |

(Continued)

OTHER PUBLICATIONS

Q.-T. Vien, H. X. Nguyen, J. Choi, B. Stewart and H. Tianfield, "Network Coding-Based Block ACK for Wireless Relay Networks," 2011 IEEE 73rd Vehicular Technology Conference (VTC Spring), Budapest, Hungary, pp. 1-5 (Year: 2011).*
International Search Report and Written Opinion—PCT/US2021/070312—ISA/EPO—Jul. 20, 2021.

*Primary Examiner* — Christopher M Crutchfield
(74) *Attorney, Agent, or Firm* — Harrity & Harrity LLP / Qualcomm

(57) ABSTRACT

Various aspects of the present disclosure generally relate to wireless communication. In some aspects, a wireless communication device may receive at least one sidelink communication on a sidelink, wherein the at least one sidelink communication includes at least one of a grant, data received on a resource identified by a grant, a multi-stage grant, a multi-packet grant, or a relaying communication; and transmit, on the sidelink or an uplink, a feedback message including a plurality of acknowledgements in connection with receiving the at least one sidelink communication. Numerous other aspects are provided.

30 Claims, 7 Drawing Sheets

(56) References Cited

U.S. PATENT DOCUMENTS

| | | | |
|---|---|---|---|
| 2011/0305176 A1* | 12/2011 | Wentink | H04W 28/12 |
| | | | 370/310 |
| 2017/0347394 A1 | 11/2017 | Yasukawa et al. | |
| 2019/0052436 A1* | 2/2019 | Desai | H04L 5/0055 |
| 2019/0124634 A1 | 4/2019 | Li et al. | |
| 2020/0029318 A1 | 1/2020 | Guo | |
| 2020/0092692 A1* | 3/2020 | Wang | H04W 76/14 |
| 2020/0099476 A1* | 3/2020 | Park | H04W 4/70 |
| 2020/0163103 A1* | 5/2020 | Kuang | H04W 72/23 |
| 2021/0028891 A1* | 1/2021 | Zhou | H04W 4/40 |
| 2021/0314991 A1* | 10/2021 | Tenny | H04W 4/40 |
| 2021/0336728 A1* | 10/2021 | Selvanesan | H04L 1/1861 |
| 2021/0377912 A1* | 12/2021 | El Hamss | H04L 1/1854 |
| 2022/0256535 A1* | 8/2022 | Horiuchi | H04L 5/0044 |
| 2023/0034294 A1* | 2/2023 | Zhang | H04W 52/0229 |

FOREIGN PATENT DOCUMENTS

| | | |
|---|---|---|
| WO | 2018022784 A1 | 2/2018 |
| WO | WO-2018151637 A1 | 8/2018 |
| WO | 2018204321 A1 | 11/2018 |
| WO | 2018222100 A1 | 12/2018 |
| WO | WO-2019019184 A1 | 1/2019 |
| WO | WO-2019059739 A1 | 3/2019 |
| WO | WO-2020004894 A1 | 1/2020 |
| WO | WO-2020033719 A1 | 2/2020 |
| WO | PCT/JP2020/018463 * | 6/2020 |
| WO | WO-2021097808 A1 * | 5/2021 |
| WO | PCT/EP2020/050398 * | 1/2022 |

* cited by examiner

SIDELINK FEEDBACK FORMAT

CROSS-REFERENCE TO RELATED APPLICATION

This Patent application claims priority to U.S. Provisional Patent Application No. 63/001,099, filed on Mar. 27, 2020, entitled "SIDELINK FEEDBACK FORMAT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink feedback messaging using a sidelink feedback format.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless communication device, may include receiving at least one sidelink communication on a sidelink, wherein the at least one sidelink communication includes at least one of a grant, data received on a resource identified by a grant, a multi-stage grant, a multi-packet grant, or a relaying communication; and transmitting, on the sidelink or an uplink, a feedback message including a plurality of acknowledgements in connection with receiving the at least one sidelink communication.

In some aspects, a wireless communication device for wireless communication may include a memory and one or more processors operatively coupled to the memory. The memory and the one or more processors may be configured to receive at least one sidelink communication on a sidelink, wherein the at least one sidelink communication includes at least one of a grant, data received on a resource identified by a grant, a multi-stage grant, a multi-packet grant, or a relaying communication; and transmit, on the sidelink or an uplink, a feedback message including a plurality of acknowledgements in connection with receiving the at least one sidelink communication.

In some aspects, a non-transitory computer-readable medium may store one or more instructions for wireless communication. The one or more instructions, when executed by one or more processors of a wireless communication device, may cause the one or more processors to receive at least one sidelink communication on a sidelink, wherein the at least one sidelink communication includes at least one of a grant, data received on a resource identified by a grant, a multi-stage grant, a multi-packet grant, or a relaying communication; and transmit, on the sidelink or an uplink, a feedback message including a plurality of acknowledgements in connection with receiving the at least one sidelink communication.

In some aspects, an apparatus for wireless communication may include means for receiving at least one sidelink communication on a sidelink, wherein the at least one sidelink communication includes at least one of a grant, data received on a resource identified by a grant, a multi-stage grant, a multi-packet grant, or a relaying communication; and means for transmitting, on the sidelink or an uplink, a feedback message including a plurality of acknowledgements in connection with receiving the at least one sidelink communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
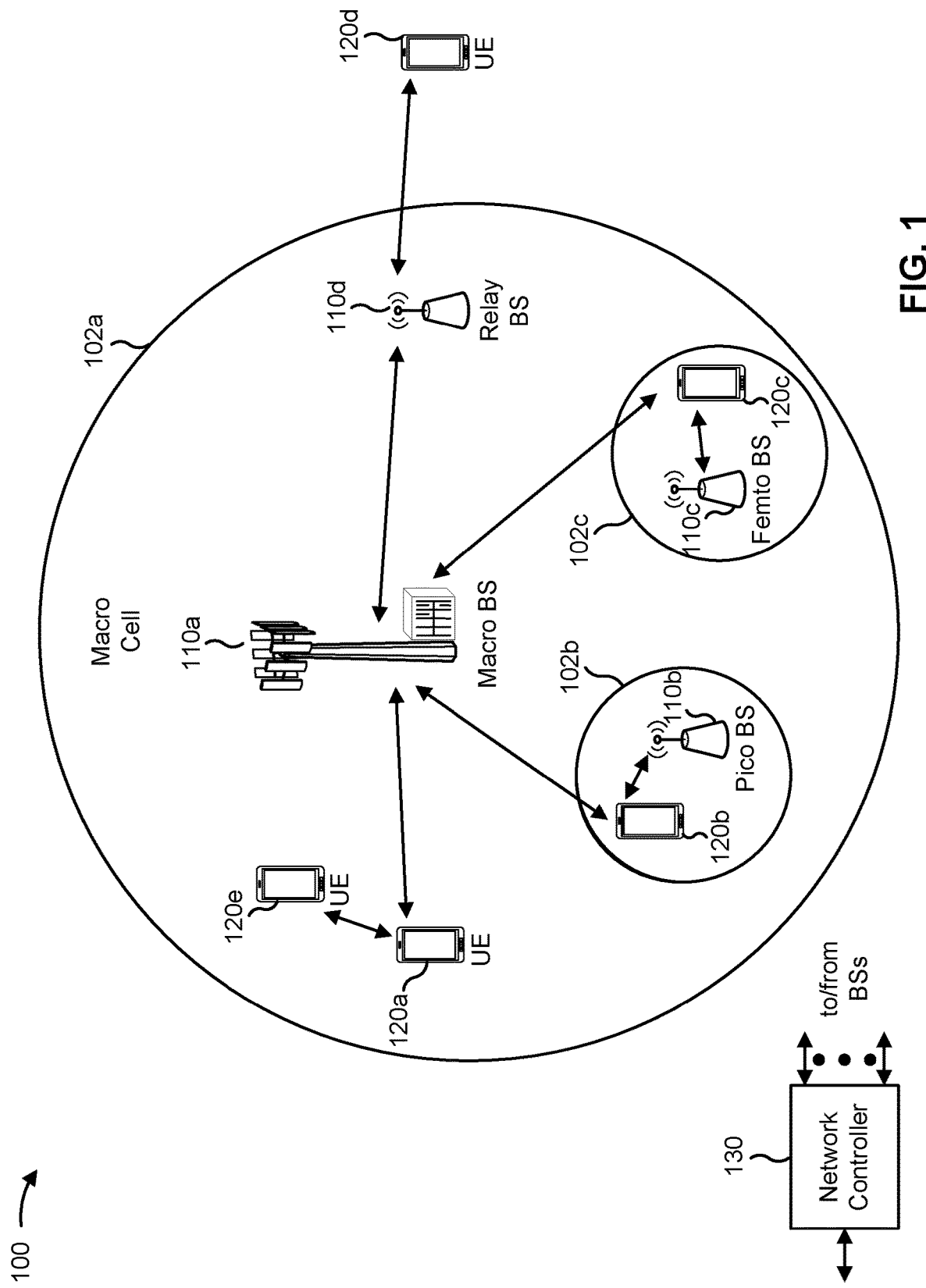
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay BS, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the BS 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHZ-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
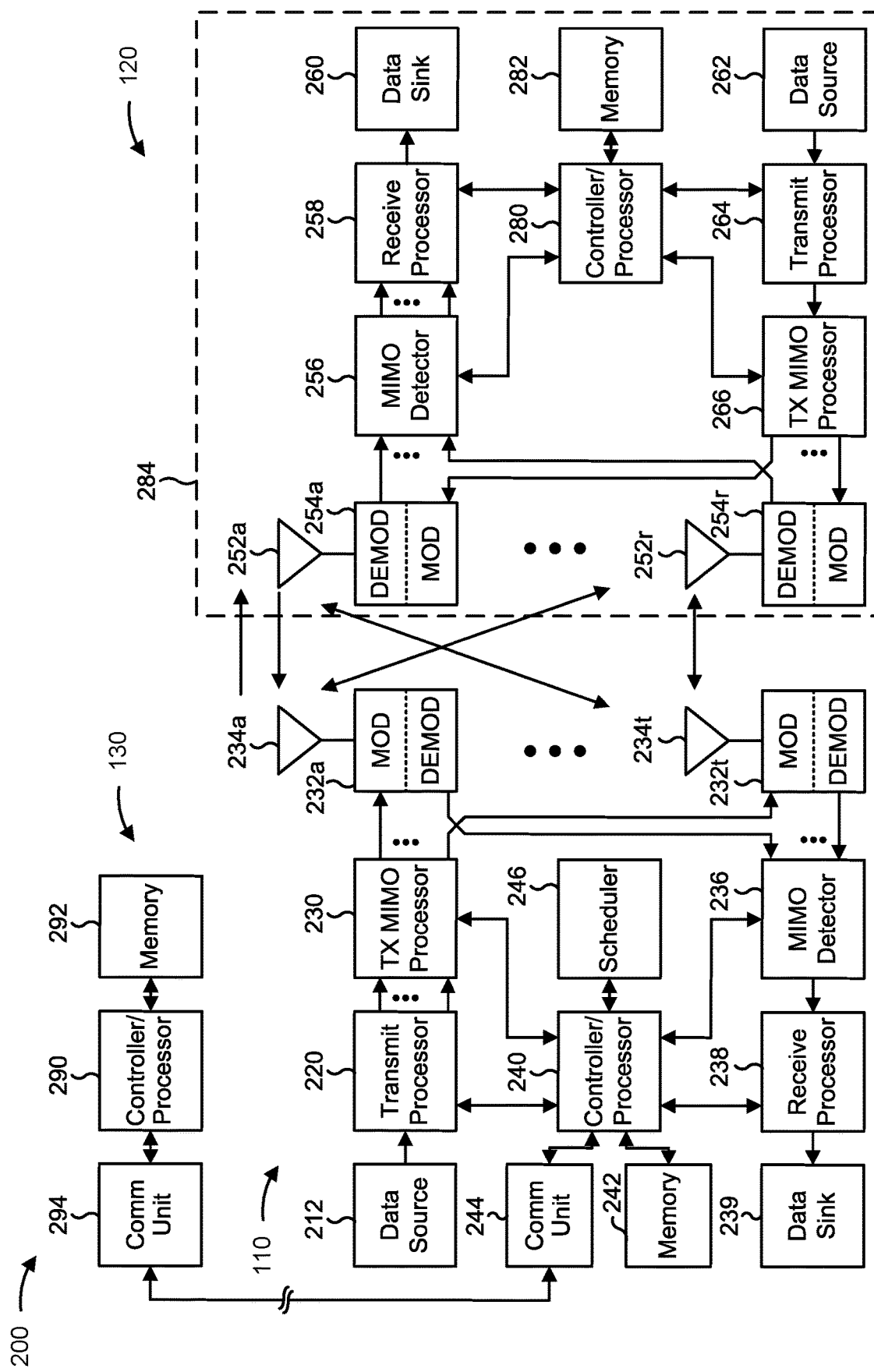
FIG. 2 is a diagram illustrating an example of a base station in communication with a UE in a wireless network, in accordance with the present disclosure.

FIG. 2 is a diagram illustrating an example 200 of a BS 110 in communication with a UE 120 in a wireless network 100, in accordance with the present disclosure. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other BSs and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with BS 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to BS 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-6.

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. BS 110 may include a scheduler 246 to schedule UEs 120 for downlink and/or uplink communications. In some aspects, a modulator and a demodulator (e.g., MOD/DEMOD 232) of the BS 110 may be included in a modem of the BS 110. In some aspects, the BS 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-6.

Controller/processor 240 of BS 110, controller/processor 280 of UE 120, and/or any other component(s) of FIG. 2 may perform one or more techniques associated with sidelink feedback messaging using a sidelink feedback format, as described in more detail elsewhere herein. For example, controller/processor 240 of BS 110, controller/processor 280 of UE 120, and/or any other component(s) of FIG. 2 may perform or direct operations of, for example, process 600 of FIG. 6 and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the BS 110 and/or the UE 120, may cause the one or more processors, the UE 120, and/or the BS 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, a wireless communication device, such as BS 110 or UE 120, may include means for receiving at least one sidelink communication on a sidelink, wherein the at least one sidelink communication includes at least one of a grant, data received on a resource identified by a grant, a multi-stage grant, a multi-packet grant, or a relaying communication, means for transmitting, on the sidelink or an uplink, a feedback message including a plurality of acknowledgements in connection with receiving the at least one sidelink communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
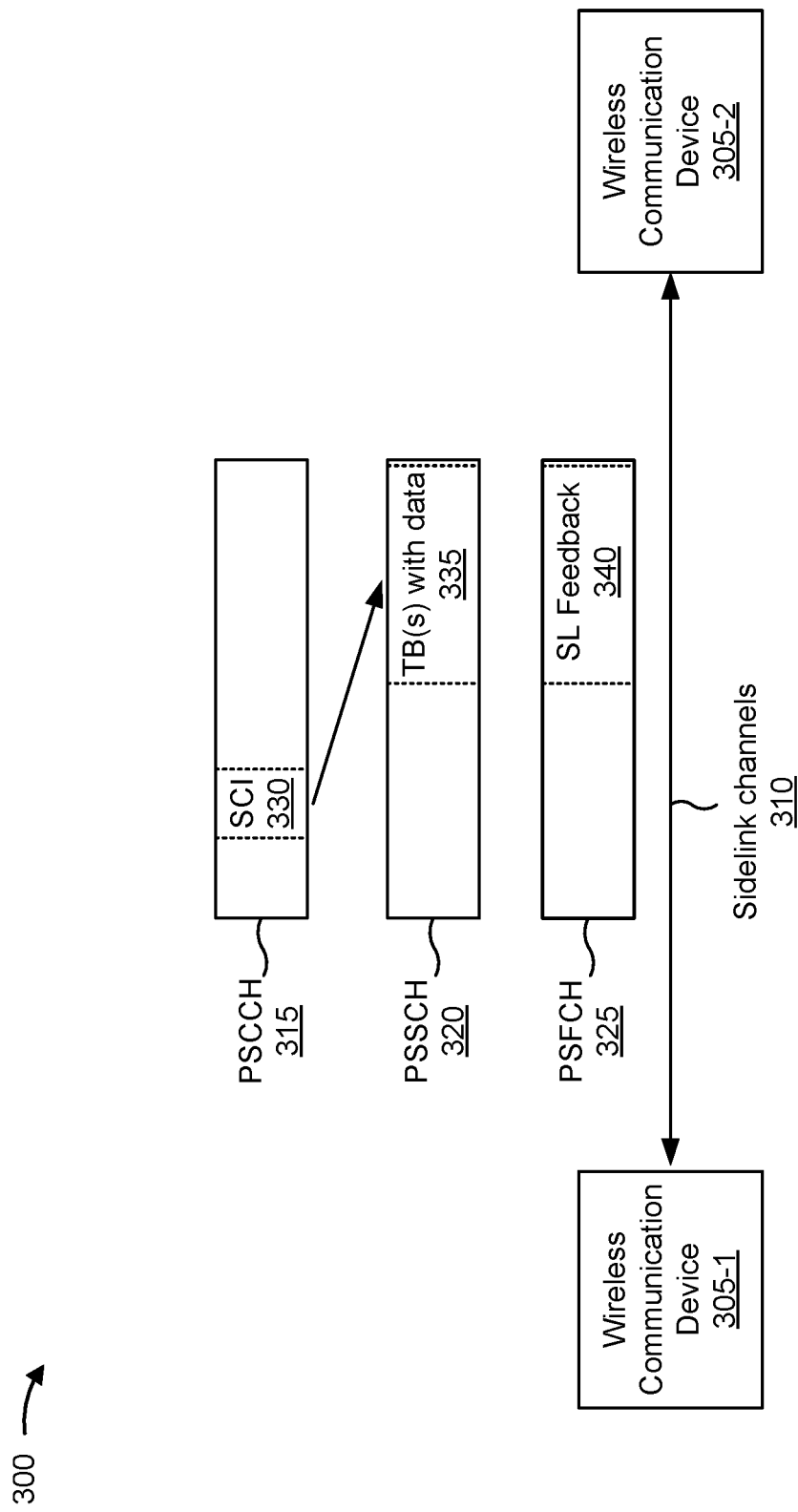
FIG. 3 is a diagram illustrating an example of sidelink communications, in accordance with the present disclosure.

FIG. 3 is a diagram illustrating an example 300 of sidelink communications, in accordance with various aspects of the present disclosure.

As shown in FIG. 3, a first wireless communication device 305-1 may communicate with a second wireless communication device 305-2 (and one or more other wireless communication devices 305) via one or more sidelink channels 310. The wireless communication devices 305-1 and 305-2 may communicate using the one or more sidelink channels 310 for P2P communications, D2D communications, V2X communications (e.g., which may include V2V communications, V2I communications, vehicle-to-pedestrian (V2P) communications, and/or the like), mesh networking, and/or the like. In some aspects, the wireless communication devices 305 (e.g., wireless communication device 305-1 and/or wireless communication device 305-2) may correspond to one or more UEs 120, BSs 110, IAB nodes, and/or the like. In some aspects, the one or more sidelink channels 310 may use a PC5 interface and/or may operate in a high frequency band (e.g., the 5.9 GHz band). Additionally, or alternatively, the wireless communication devices 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a BS 110 via an access link or an access channel. The PSSCH 320 may be used to communicate data, similar to a physical downlink shared channel (PDSCH) and/or a physical uplink shared channel (PUSCH) used for cellular communications with a BS 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a wireless communication device 305 may operate using a transmission mode where resource selection and/or scheduling is performed by the wireless communication device 305 (e.g., rather than a BS 110). In some aspects, the wireless communication device 305 may perform resource selection and/or scheduling by sensing channel availability for transmissions. For example, the wireless communication device 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the wireless communication device 305 may perform resource selection and/or scheduling using SCI 330 received in the PSCCH 315, which may indicate occupied resources, channel parameters, and/or the like. Additionally, or alternatively, the wireless communication device 305 may perform resource selection and/or scheduling by determining a channel busy rate (CBR) associated with various sidelink channels, which may be used for rate control (e.g., by indicating a maximum number of resource blocks that the wireless communication device 305 can use for a particular set of subframes).

In the transmission mode where resource selection and/or scheduling is performed by a wireless communication device 305, the wireless communication device 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a wireless communication device 305 may generate a sidelink grant that indicates one or more parameters for semi-persistent scheduling (SPS), such as a periodicity of a sidelink transmission. Additionally, or alternatively, the wireless communication device 305 may generate a sidelink grant for event-driven scheduling, such as for an on-demand sidelink message.

As indicated above, FIG. 3 is provided as an example. Other examples may differ from what is described with respect to FIG. 3.

Figure 4:
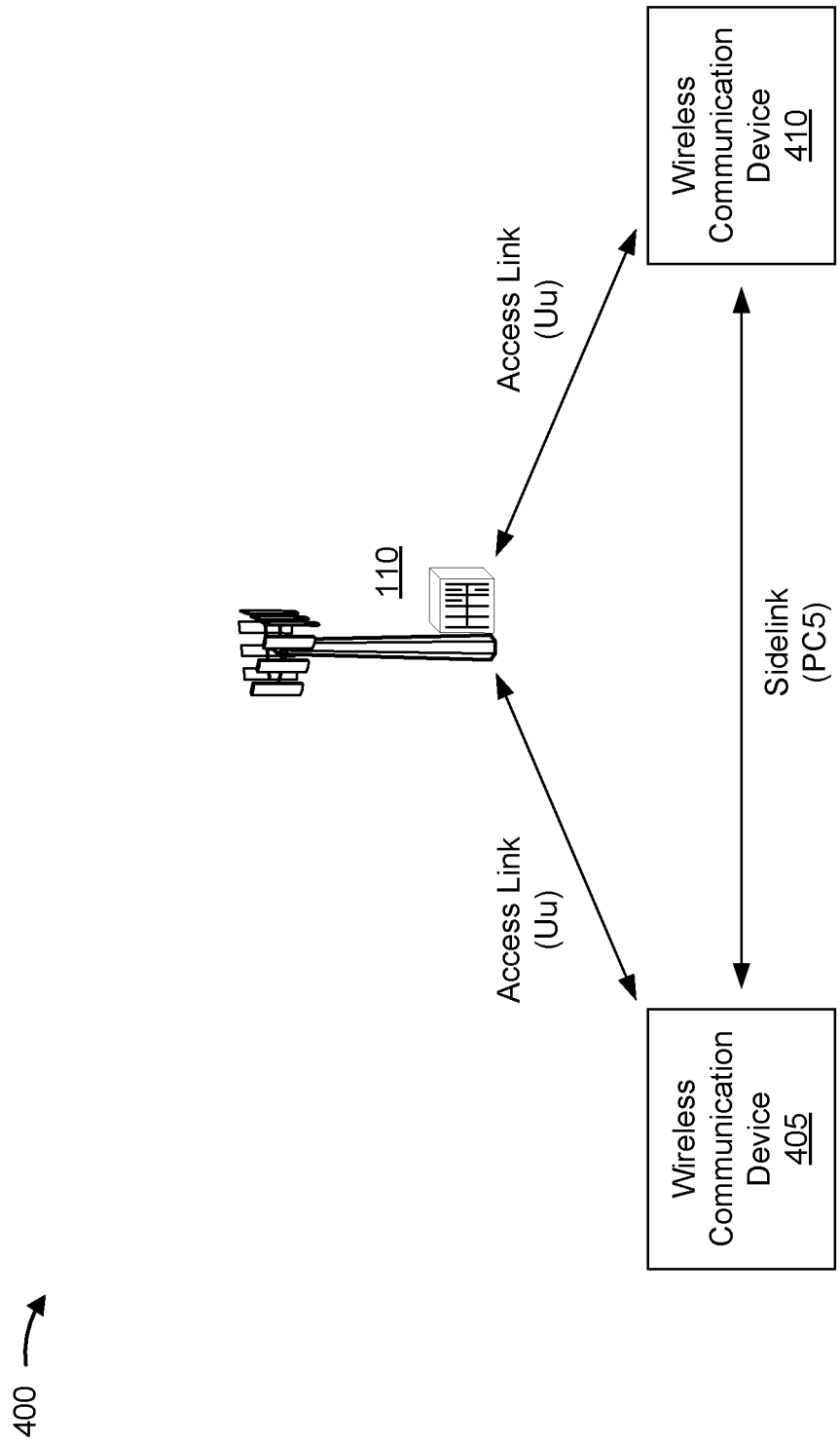
FIG. 4 is a diagram illustrating an example of sidelink communications and access link communications, in accordance with the present disclosure.

FIG. 4 is a diagram illustrating an example 400 of sidelink communications and access link communications, in accordance with various aspects of the present disclosure.

As shown in FIG. 4, a wireless communication device 405 and a wireless communication device 410 may communicate with one another via a sidelink, as described above in connection with FIG. 3. As further shown, in some sidelink modes, a BS 110 may communicate with the wireless communication device 405 via a first access link. Additionally, or alternatively, in some sidelink modes, the BS 110 may communicate with the wireless communication device 410 via a second access link. The wireless communication device 405 and/or the wireless communication device 410 may correspond to one or more UEs 120, BSs 110, integrated access and backhauling (IAB) nodes, and/or the like. As an example, a sidelink may refer to a direct link between UEs 120, and an access link may refer to a direct link between a BS 110 and a UE 120. Sidelink communications may be transmitted on a PC5 interface via the sidelink, and access link communications may be transmitted via the access link. An access link communication may be either a downlink communication (from a BS 110 to a UE 120) or an uplink communication (from a UE 120 to a BS 110) on a Uu interface.

As indicated above, FIG. 4 is provided as an example. Other examples may differ from what is described with respect to FIG. 4.

As described above, a wireless communication device may communicate with a BS on a Uu interface associated with an access link. For example, a wireless communication device may transmit a PUCCH communication on an uplink to convey an acknowledgement message to acknowledge downlink data. Additionally, or alternatively, the wireless communication device may include an acknowledgment message with a PUSCH communication.

Similarly, a first wireless communication device may communicate with a second wireless communication device on a PC5 interface associated with a sidelink. In this case, the first wireless communication device may transmit a feedback message, such as an acknowledgement (ACK) message or a negative acknowledgement (NACK) message on PSFCH. In this case, the first wireless communication device may time division multiplex (TDM) a PSCCH, PSSCH, and a PSFCH for transmission. In some aspects, such as in V2X or other deployments, the first wireless communication device may not frequency division multiplex (FDM) the aforementioned channels. As a result of multi-stage grants, multi-packet grants, relaying grants, and/or the like, a volume of acknowledgements transmitted on the PSFCH may result in an excessive utilization of network resources. Although some aspects are described herein in terms of a UE in communication with another UE on a sidelink and a BS on an uplink, other configurations are possible, such as an IAB configuration with a plurality of wireless communication devices (e.g., which may be UEs, BSs, nodes, and/or the like) communicating on one or more access links, sidelinks, backhaul links, and/or the like.

Some aspects described herein enable a particular sidelink feedback format. For example, when a wireless communication device receives information, such as a grant, data on a resource identified by a grant, a multi-stage grant, a multi-packet grant, a relaying communication, and/or the like, the wireless communication device may consolidate a plurality of feedback messages into a single bundled feedback message. In this case, the wireless communication device may use a PSCCH format message, a MAC CE, and/or the like configured for conveying bundled feedback message. In this way, the wireless communication device may enable feedback messaging without an excessive utilization of network resources. Additionally, or alternatively, the wireless communication device may use a plurality of PSFCH resources to convey multiple acknowledgment feedback messages, for example, if the resources are available, or if the number of messages is relatively small.

Figure 5:
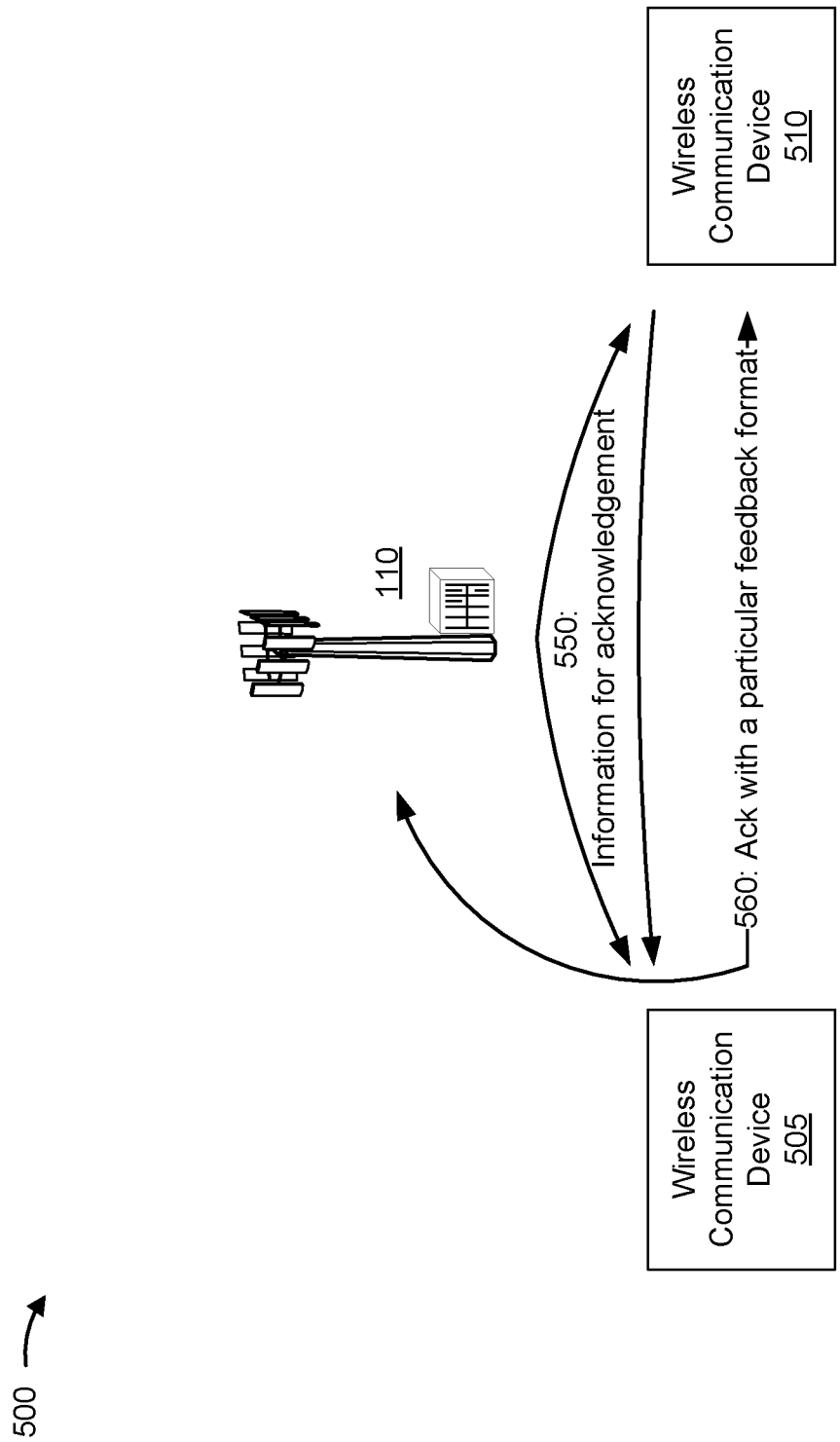
FIG. 5 is a diagram illustrating an example of sidelink feedback messaging, in accordance with the present disclosure.

FIG. 5 is a diagram illustrating an example 500 of sidelink feedback messaging, in accordance with various aspects of the present disclosure. As shown in FIG. 5, example 500 includes a first wireless communication device 505, a second wireless communication device 510, and a BS 110.

As further shown in FIG. 5, and by reference number 550, wireless communication device 505 may receive information for acknowledgement. For example, wireless communication device 505 may receive information for acknowledgement from wireless communication device 510, from BS 110, from BS 110 via wireless communication device 510, and/or the like. In some aspects, wireless communication device 505 may receive a grant that wireless communication device 505 is to acknowledge. For example, wireless communication device 505 may receive the grant from BS 110 (e.g., via wireless communication device 510, in some aspects). Additionally, or alternatively, wireless communication device 505 may receive data on a resource granted by a grant and may be triggered to acknowledge the received data (or to negatively acknowledge a failure to receive data on the resource granted by the grant).

In some aspects, wireless communication device 505 may receive a multi-stage grant or a multi-packet grant. For example, wireless communication device may receive a two-stage grant or a higher-stage grant (e.g., n stages). In the case of a two-stage grant, wireless communication device 505 may receive a stage-1 grant in a sidelink control information (SCI) of a PSCCH and the SCI may direct wireless communication device 505 to receive a stage-2 grant in an SCI mapped to a set of contiguous resource blocks in a PSSCH. Additionally, or alternatively, for a n-stage grant, wireless communication device 505 may receive an n–2-stage grant that includes information for decoding an n–1-stage grant (e.g., frequency or time resource information for the n–1 stage grant), which may include information for decoding an n-stage grant (e.g., frequency or time resource information for the n stage grant), and/or the like.

Similarly, for a multi-packet grant, wireless communication device 505 may receive a plurality of independently encoded packets conveying a grant (e.g., or a stage of a multi-stage grant). For example, for a multi-stage, multi-packet grant, a first stage grant may include information identifying a quantity of packets for a second stage grant. Additionally, or alternatively, the quantity of packets may be fixed in a standard. In some aspects, wireless communication device 505 may receive a multi-packet grant for relaying to a plurality of wireless communication devices 510. For example, each packet, of the multi-packet grant, may identify a different wireless communication device 510 to which wireless communication device 505 is to relay the packet.

In some aspects, wireless communication device 505 may receive a multi-packet grant or a multi-stage grant form a plurality of granting sources. For example, wireless communication device 505 may receive a first stage of a grant from BS 110, which may cause wireless communication device 505 to receive a second stage of the grant from wireless communication device 510. In this case, wireless communication device 505 may be triggered to transmit acknowledgement messages to a plurality of different devices (e.g., the plurality of granting sources).

In some aspects, wireless communication device 505 may receive information for relaying. For example, wireless communication device 505 may receive, from wireless communication device 510, a packet for relaying to BS 110 and may acknowledge receipt of the packet for relaying. Additionally, or alternatively, based at least in part on relaying the packet, wireless communication device 505 may receive an acknowledgement of a success of relaying the packet and may relay the acknowledgement to wireless communication device 510, as described in more detail herein.

As further shown in FIG. 5, and by reference number 560, wireless communication device 505 may transmit a feedback message. For example, wireless communication device 505 may transmit the feedback message to wireless communication device 510. Additionally, or alternatively, wireless communication device 505 may transmit a feedback message to a plurality of wireless communication devices 510, to BS 110, and/or the like. In some aspects, wireless communication device 505 may bundle a plurality of acknowledgement feedback messages for transmission. For example, with regard to a multi-stage grant or multi-packet grant, rather than transmitting a separate feedback message for each received packet, wireless communication device 505 may bundle two or more received packets into a single feedback message.

In some aspects, wireless communication device 505 may use a particular format message to convey a feedback message or a plurality of feedback messages bundled into a single feedback message. For example, wireless communication device 505 may transmit a feedback message to wireless communication device 510 using a PSCCH message with a format that includes an indicator that the PSCCH message includes one or more acknowledgement messages. In this case, wireless communication device 505 may use a pre-configured resource for the PSCCH message, thereby obviating a need for wireless communication device 510 to perform blind decoding.

In some aspects, wireless communication device 505 may transmit a medium access control (MAC) control element (CE) on the PSSCH to convey the feedback message. For example, wireless communication device 505 may transmit a MAC CE with a static resource and/or modulation and coding scheme (MCS). In this way, based at least in part on using a static resource and/or MCS, wireless communication device 505 may enable a reduced utilization of network resources on the PSSCH. Additionally, or alternatively, wireless communication device 505 may transmit the MAC CE on a PUSCH to BS 110. For example, wireless communication device 505 may transmit the MAC CE on a Uu interface to BS 110 to acknowledge, for example, relayed data. In some aspects, wireless communication device 505 may transmit the feedback message on a plurality of channels. For example, wireless communication device 505 may use a PSCCH to transmit an acknowledgement for a grant stage and may use a PSSCH to convey a MAC CE that includes a plurality of acknowledgements for payload data associated with the grant stage.

In some aspects, wireless communication device 505 may include an indication that a channel, on which the MAC CE is transmitted (e.g., the PSCCH or PUSCH), is to include only one or more MAC CEs during a particular transmission opportunity. In this way, wireless communication device 505 may enable reuse of a data channel physical transmission chain and (by wireless communication device 510) reuse of a reception chain. In some aspects, the indication that the channel includes a MAC CE for a feedback message may be included in a grant. For example, BS 110 may transmit a grant on a PDCCH for use of a PUSCH and may include an indication that the use of the PUSCH is for the MAC CE for the feedback message. Additionally, or alternatively, wireless communication device 505 may receive a grant on a PSCCH for transmission on a PSSCH that may include information indicating that the grant is to be used for a MAC CE for the feedback message. In this case, the grant may be a grant related to packets for which wireless communication device 505 is transmitting the feedback message (e.g., a stage of a multi-stage grant).

In some aspects, wireless communication device 505 may receive an explicit resource allocation for transmitting the feedback message. For example, wireless communication device 505 may receive an explicit allocation (e.g., of time resources, frequency resources, a beam to use, and/or the like) for transmitting a MAC CE (e.g., via a PSCCH). In contrast, wireless communication device 505 may implicitly determine the PSCCH itself. In some aspects, wireless communication device 505 may quasi-co-locate (QCL) the feedback message with a message that triggered the feedback message. For example, when wireless communication device 505 receives a packet for which to transmit a feedback message, wireless communication device 505 may QCL the feedback message with the packet. In this case, when wireless communication device 505 is transmitting the feedback message as a response to, for example, a plurality of packets, wireless communication device 505 may select a packet, from the plurality of packets, with which to QCL the feedback message. For example, wireless communication device 505 may select the packet based at least in part on a packet resource time (e.g., a most recent packet), a packet priority (e.g., a control packet, a granting packet, and/or the like may have higher priorities than a data packet), a packet from a source to which the feedback message is to be transmitted, and/or the like. In some aspects, wireless communication device 505 may select a default (e.g., pre-configured) transmit beam for the feedback message.

In some aspects, wireless communication device 505 may receive a feedback message as a response to a feedback message. For example, when wireless communication device 505 transmits a MAC CE to acknowledge a plurality of communications (e.g., a plurality of packets or stages of a grant), wireless communication device 505 may receive hybrid automatic repeat request (HARQ) feedback information as a response to the MAC CE indicating a successful receipt of the MAC CE.

As indicated above, FIG. 5 is provided as an example. Other examples may differ from what is described with respect to FIG. 5.

Figure 6:
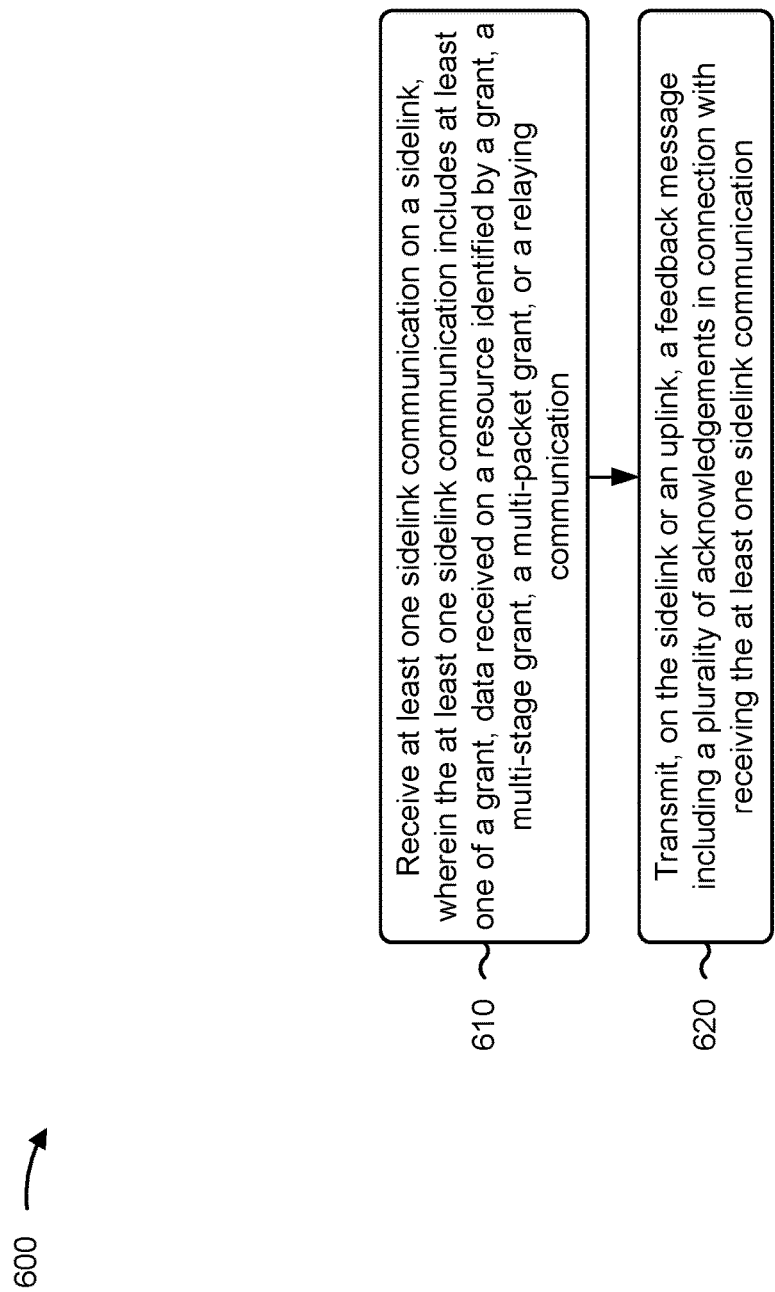
FIG. 6 is a diagram illustrating an example process associated with sidelink feedback messaging, in accordance with the present disclosure.

FIG. 6 is a diagram illustrating an example process 600 performed, for example, by a wireless communication device, in accordance with various aspects of the present disclosure. Example process 600 is an example where the wireless communication device (e.g., BS 110; UE 120; wireless communication devices 305, 405, 410, 505, or 510; and/or the like) performs operations associated with a sidelink feedback format.

As shown in FIG. 6, in some aspects, process 600 may include receiving at least one sidelink communication on a sidelink, wherein the at least one sidelink communication includes at least one of a grant, data received on a resource identified by a grant, a multi-stage grant, a multi-packet grant, or a relaying communication (block 610). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive at least one sidelink communication on a sidelink, as described above. In some aspects, the at least one sidelink communication includes at least one of a grant, data received on a resource identified by a grant, a multi-stage grant, a multi-packet grant, a relaying communication, or some combination thereof.

As further shown in FIG. 6, in some aspects, process 600 may include transmitting, on the sidelink or an uplink, a feedback message including a plurality of acknowledgements in connection with receiving the at least one sidelink communication (block 620). For example, the wireless communication device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, on the sidelink or an uplink, a feedback message including a plurality of acknowledgements in connection with receiving the at least one sidelink communication, as described above.

Process 600 may include additional aspects, such as any single aspect or any combination of aspects described below and/or in connection with one or more other processes described elsewhere herein.

In a first aspect, the feedback message is a physical sidelink control channel format message including an indicator that the feedback message includes the plurality of acknowledgments.

In a second aspect, alone or in combination with the first aspect, a resource for the feedback message is pre-configured.

In a third aspect, alone or in combination with one or more of the first and second aspects, the feedback message is a medium access control (MAC) control element format message.

In a fourth aspect, alone or in combination with one or more of the first through third aspects, the feedback message is associated with a static resource or modulation and coding scheme.

In a fifth aspect, alone or in combination with one or more of the first through fourth aspects, the feedback message is a physical uplink shared channel message.

In a sixth aspect, alone or in combination with one or more of the first through fifth aspects, the wireless communication device is configured to process the feedback message using a physical layer transmit chain.

In a seventh aspect, alone or in combination with one or more of the first through sixth aspects, process 600 includes transmitting or receiving an indication that the feedback message includes the plurality of acknowledgements.

In an eighth aspect, alone or in combination with one or more of the first through seventh aspects, the indication is included in at least one of: a grant, a physical sidelink control channel communication, a physical sidelink shared channel communication, a physical downlink control channel communication, a physical uplink shared channel communication, or some combination thereof.

In a ninth aspect, alone or in combination with one or more of the first through eighth aspects, process 600 includes receiving or transmitting another feedback message as a response to transmitting or receiving the indication.

In a tenth aspect, alone or in combination with one or more of the first through ninth aspects, transmitting the feedback message includes transmitting the feedback message using the resource allocation.

In an eleventh aspect, alone or in combination with one or more of the first through tenth aspects, the resource allocation is identified based at least in part on a scheduling physical sidelink control channel.

In a twelfth aspect, alone or in combination with one or more of the first through eleventh aspects, the resource allocation includes at least one of a time allocation, a frequency allocation, a beam allocation, or some combination thereof.

In a thirteenth aspect, alone or in combination with one or more of the first through twelfth aspects, the resource allocation is based at least in part on a destination wireless node for the feedback message.

In a fourteenth aspect, alone or in combination with one or more of the first through thirteenth aspects, the feedback message is quasi-co-located with at least one packet of the at least one sidelink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
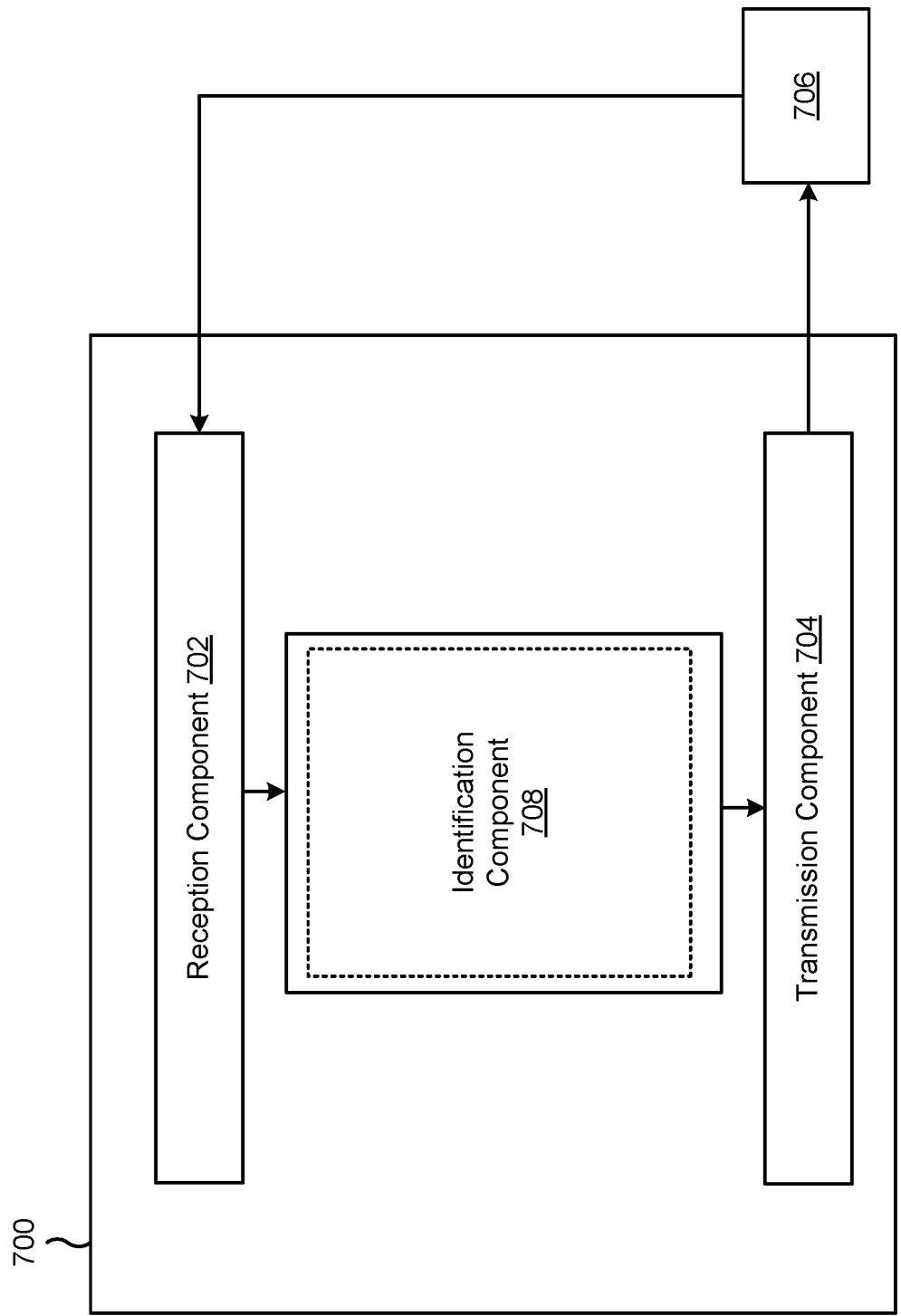
FIG. 7 is a block diagram of an example apparatus for wireless communication, in accordance with the present disclosure.

FIG. 7 is a block diagram of an example apparatus 700 for wireless communication. The apparatus 700 may be a wireless communication device, or a wireless communication device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a BS, or another wireless communication device) using the reception component 702 and the transmission component 704. As further shown, the apparatus 700 may include one or more of a identification component 708 among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the wireless communication device described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the wireless communication device described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the wireless communication device described above in connection with FIG. 2. In some aspects, the transmission component 704 may be co-located with the reception component 702 in a transceiver.

The reception component 702 may receive at least one sidelink communication on a sidelink, wherein the at least one sidelink communication includes at least one of a grant, data received on a resource identified by a grant, a multi-stage grant, a multi-packet grant, or a relaying communication. The transmission component 704 may transmit, on the sidelink or an uplink, a feedback message including a plurality of acknowledgements in connection with receiving the at least one sidelink communication.

The transmission component 704 may transmit or receiving an indication that the feedback message includes the plurality of acknowledgements.

The reception component 702 may receive or transmitting another feedback message as a response to transmitting or receiving the indication.

The identification component 708 may identify a resource allocation for transmitting the feedback message.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a wireless communication device, comprising: receiving at least one sidelink communication on a sidelink, wherein the at least one sidelink communication includes at least one of a grant, data received on a resource identified by a grant, a multi-stage grant, a multi-packet grant, or a relaying communication; and transmitting, on the sidelink or an uplink, a feedback message including a plurality of acknowledgements in connection with receiving the at least one sidelink communication.

Aspect 2: The method of Aspect 1, wherein the feedback message is a physical sidelink control channel format message including an indicator that the feedback message includes the plurality of acknowledgments.

Aspect 3: The method of Aspect 2, wherein a resource for the feedback message is pre-configured.

Aspect 4: The method of any of Aspects 1 to 3, wherein the feedback message is a medium access control (MAC) control element format message.

Aspect 5: The method of any of Aspects 1 to 4, wherein the feedback message is associated with a static resource or modulation and coding scheme.

Aspect 6: The method of any of Aspects 1 to 5, wherein the feedback message is a physical uplink shared channel message.

Aspect 7: The method of any of Aspects 1 to 6, wherein the wireless communication device is configured to process the feedback message using a physical layer transmit chain.

Aspect 8: The method of any of Aspects 1 to 7, further comprising: transmitting or receiving an indication that the feedback message includes the plurality of acknowledgements.

Aspect 9: The method of Aspect 8, wherein the indication is included in at least one of: a grant, a physical sidelink control channel communication, a physical sidelink shared channel communication, a physical downlink control channel communication, a physical uplink shared channel communication, or some combination thereof.

Aspect 10: The method of any of Aspects 8 to 9, further comprising: receiving or transmitting another feedback message as a response to transmitting or receiving the indication.

Aspect 11: The method of any of Aspects 1 to 10, further comprising: identifying a resource allocation for transmitting the feedback message; and wherein transmitting the feedback message comprises: transmitting the feedback message using the resource allocation, wherein transmitting the feedback message comprises: transmitting the feedback message using the resource allocation.

Aspect 12: The method of Aspect 11, wherein the resource allocation is identified based at least in part on a scheduling physical sidelink control channel.

Aspect 13: The method of any of Aspects 11 to 12, wherein the resource allocation includes at least one of a time allocation, a frequency allocation, a beam allocation, or some combination thereof.

Aspect 14: The method of any of Aspects 11 to 13, wherein the resource allocation is based at least in part on a destination wireless node for the feedback message.

Aspect 15: The method of any of Aspects 1 to 14, wherein the feedback message is quasi-co-located with at least one packet of the at least one sidelink communication.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
    receiving at least one sidelink communication on a sidelink, wherein the at least one sidelink communication includes at least one of a grant for a transmission on a physical sidelink shared channel, a multi-stage grant for a transmission on the physical sidelink shared channel, a multi-packet grant for a transmission on the physical sidelink shared channel, or a relaying communication on the physical sidelink shared channel; and transmitting, on the sidelink or an uplink, a feedback message including a plurality of acknowledgements, wherein at least one of the plurality of acknowledgements is for the grant, the multi-stage grant, the multi-packet grant, or the relaying communication received on the sidelink, wherein the feedback message is associated with an indication that the feedback message includes the plurality of acknowledgments, and wherein the feedback message is quasi-co-located with at least one packet of the at least one sidelink communication.

2. The method of claim 1, wherein the feedback message is a physical sidelink control channel format message including the indication that the feedback message includes the plurality of acknowledgments.

3. The method of claim 2, wherein a resource for the feedback message is pre-configured.

4. The method of claim 1, wherein the feedback message is a medium access control (MAC) control element format message.

5. The method of claim 1, wherein the feedback message is associated with a static resource or modulation and coding scheme.

6. The method of claim 1, wherein the feedback message is a physical uplink shared channel message.

7. The method of claim 1, wherein the wireless communication device is configured to process the feedback message using a physical layer transmit chain.

8. The method of claim 1, further comprising:
transmitting or receiving the indication that the feedback message includes the plurality of acknowledgements.

9. The method of claim 8, wherein the indication is included in at least one of:
a grant,
a physical sidelink control channel communication,
a physical sidelink shared channel communication,
a physical downlink control channel communication,
a physical uplink shared channel communication, or
some combination thereof.

10. The method of claim 8, further comprising:
receiving or transmitting another feedback message as a response to transmitting or receiving the indication.

11. The method of claim 1, further comprising:
identifying a resource allocation for transmitting the feedback message; and
wherein transmitting the feedback message comprises:
transmitting the feedback message using the resource allocation.

12. The method of claim 11, wherein the resource allocation is identified based at least in part on a scheduling physical sidelink control channel.

13. The method of claim 11, wherein the resource allocation includes at least one of a time allocation, a frequency allocation, a beam allocation, or some combination thereof.

14. The method of claim 11, wherein the resource allocation is based at least in part on a destination wireless node for the feedback message.

15. The method of claim 1, further comprising:
selecting a packet of the at least one sidelink communication, with which to quasi-co-locate the feedback message.

16. A wireless communication device for wireless communication, comprising:
one or more memories; and
one or more processors operatively coupled to the one or more memories, the one or more memories and the one or more processors configured to:
receive at least one sidelink communication on a sidelink, wherein the at least one sidelink communication includes at least one of a grant for a transmission on a physical sidelink shared channel, a multi-stage grant for a transmission on the physical sidelink shared channel, a multi-packet grant for a transmission on the physical sidelink shared channel, or a relaying communication on the physical sidelink shared channel; and
transmit, on the sidelink or an uplink, a feedback message including a plurality of acknowledgements, wherein at least one of the plurality of acknowledgements is for the grant, the multi-stage grant, the multi-packet grant, or the relaying communication received on the sidelink, wherein the feedback message is associated with an indication that the feedback message includes the plurality of acknowledgments, and wherein the feedback message is quasi-co-located with at least one packet of the at least one sidelink communication.

17. The wireless communication device of claim 16, wherein the feedback message is a physical sidelink control channel format message including the indication that the feedback message includes the plurality of acknowledgments.

18. The wireless communication device of claim 17, wherein a resource for the feedback message is pre-configured.

19. The wireless communication device of claim 16, wherein the feedback message is a medium access control (MAC) control element format message.

20. The wireless communication device of claim 16, wherein the feedback message is associated with a static resource or modulation and coding scheme.

21. The wireless communication device of claim 16, wherein the feedback message is a physical uplink shared channel message.

22. The wireless communication device of claim 16, wherein the wireless communication device is configured to process the feedback message using a physical layer transmit chain.

23. The wireless communication device of claim 16, wherein the one or more processors are further configured to:
transmit or receive the indication that the feedback message includes the plurality of acknowledgements.

24. The wireless communication device of claim 23, wherein the indication is included in at least one of:
a grant,
a physical sidelink control channel communication,
a physical sidelink shared channel communication,
a physical downlink control channel communication,
a physical uplink shared channel communication, or
some combination thereof.

25. The wireless communication device of claim 23, wherein the one or more processors are further configured to:
receive or transmit another feedback message as a response to transmitting or receiving the indication.

26. The wireless communication device of claim 16, wherein the one or more processors are further configured to:
identify a resource allocation for transmitting the feedback message; and wherein the one or more processors, when transmitting the feedback message, are configured to:
 transmit the feedback message using the resource allocation.

27. The wireless communication device of claim 26, wherein the resource allocation is identified based at least in part on a scheduling physical sidelink control channel.

28. The wireless communication device of claim 26, wherein the resource allocation includes at least one of a time allocation, a frequency allocation, a beam allocation, or some combination thereof.

29. A non-transitory computer-readable medium storing one or more instructions for wireless communication, the one or more instructions comprising:
 one or more instructions that, when executed by one or more processors of a wireless communication device, cause the one or more processors to:
  receive at least one sidelink communication on a sidelink, wherein the at least one sidelink communication includes at least one of a grant for a transmission on a physical sidelink shared channel, a multi-stage grant for a transmission on the physical sidelink shared channel, a multi-packet grant for a transmission on the physical sidelink shared channel, or a relaying communication on the physical sidelink shared channel; and
  transmit, on the sidelink or an uplink, a feedback message including a plurality of acknowledgements, wherein at least one of the plurality of acknowledgements is for the grant, the multi-stage grant, the multi-packet grant, or the relaying communication received on the sidelink, wherein the feedback message is associated with an indication that the feedback message includes the plurality of acknowledgments, and wherein the feedback message is quasi-co-located with at least one packet of the at least one sidelink communication.

30. An apparatus for wireless communication, comprising:
 means for receiving at least one sidelink communication on a sidelink, wherein the at least one sidelink communication includes at least one of a grant for a transmission on a physical sidelink shared channel, a multi-stage grant for a transmission on the physical sidelink shared channel, a multi-packet grant for a transmission on the physical sidelink shared channel, or a relaying communication on the physical sidelink shared channel; and
 means for transmitting, on the sidelink or an uplink, a feedback message including a plurality of acknowledgements, wherein at least one of the plurality of acknowledgements is for the grant, the multi-stage grant, the multi-packet grant, or the relaying communication received on the sidelink, wherein the feedback message is associated with an indication that the feedback message includes the plurality of acknowledgments, and wherein the feedback message is quasi-co-located with at least one packet of the at least one sidelink communication.

* * * * *